United States Patent [19]

Gore

[11] 4,318,652

[45] Mar. 9, 1982

[54] CONNECTOR PLATE

[75] Inventor: Charles E. Gore, Seattle, Wash.

[73] Assignee: Truswal Systems Corporation, Madison Heights, Mich.

[21] Appl. No.: 53,366

[22] Filed: Jun. 29, 1979

[51] Int. Cl.³ ............................................. F16B 15/00
[52] U.S. Cl. .................................................. 411/468
[58] Field of Search ................. 85/13, 11, 49; 52/639, 52/712, DIG. 6; 411/468, 467, 461, 457

[56] References Cited

U.S. PATENT DOCUMENTS

| | | | |
|---|---|---|---|
| Re. 28,427 | 5/1975 | Menge | 85/13 |
| 2,844,852 | 7/1958 | West | 85/13 X |
| 2,885,749 | 5/1959 | Jureit | 85/13 X |
| 3,011,226 | 12/1961 | Menge | 85/13 X |
| 3,016,586 | 1/1962 | Atkins | 85/13 X |
| 3,068,738 | 12/1962 | Nulick | 85/13 |
| 3,090,088 | 5/1963 | Foley et al. | 85/13 X |
| 3,172,171 | 3/1965 | Knight | 85/13 X |
| 3,241,424 | 3/1966 | Moehlenpah et al. | 85/13 |
| 3,266,362 | 8/1966 | Carr | 85/13 |
| 3,277,768 | 10/1966 | Templin et al. | 85/13 |
| 3,292,481 | 12/1966 | Couch | 85/13 |
| 3,295,405 | 1/1967 | Burke | 85/13 |
| 3,304,106 | 2/1967 | McCormack | 85/13 X |
| 3,305,252 | 2/1967 | Jureit | 85/13 X |
| 3,310,324 | 3/1967 | Boden | 85/13 X |
| 3,322,017 | 5/1967 | Dufficy | 85/13 |
| 3,322,018 | 5/1967 | Moehlenpah et al. | 85/13 |
| 3,343,439 | 9/1967 | Koenigshof | 85/13 |
| 3,347,126 | 10/1967 | Templin et al. | 85/13 |
| 3,362,277 | 1/1968 | Moehlenpah et al. | 85/13 |
| 3,364,805 | 1/1968 | Sanford | 85/13 |
| 3,382,752 | 5/1968 | Black et al. | 85/13 |
| 3,390,902 | 7/1968 | Jureit | 85/13 X |
| 3,417,651 | 12/1968 | Moehlenpah | 85/13 |
| 3,427,055 | 2/1969 | Jureit et al. | 85/13 X |
| 3,454,292 | 7/1969 | Sanford | 85/13 X |
| 3,479,919 | 11/1969 | Lidsky | 85/13 |
| 3,479,920 | 11/1969 | Sanford | 85/13 |
| 3,494,645 | 2/1970 | Jureit | 85/13 X |
| 3,498,170 | 3/1970 | Sanford | 85/13 |
| 3,498,171 | 3/1970 | Jureit | 85/13 |
| 3,603,197 | 9/1971 | Wood | 85/13 |
| 3,633,454 | 1/1972 | Schmitt | 85/13 |
| 3,703,304 | 11/1972 | Losee | 85/13 X |
| 3,841,195 | 10/1974 | Jureit | 85/13 |
| 3,861,094 | 1/1975 | Jureit | 85/13 X |
| 3,892,160 | 7/1975 | Jureit | 85/13 |
| 3,910,153 | 10/1975 | Jureit | 85/13 |
| 3,951,033 | 4/1976 | Moehlenpah | 85/13 |
| 4,031,803 | 6/1977 | Jureit | 85/13 |
| 4,165,672 | 8/1979 | Jureit et al. | 85/13 |

Primary Examiner—Ramon S. Britts
Attorney, Agent, or Firm—Dressler, Goldsmith, Shore, Sutker & Milnamow, Ltd.

[57] ABSTRACT

A connector plates for joining together wooden members is formed by striking out longitudinally aligned rows of pairs of teeth from a thin metal plate leaving a single elongate slot in the plate between the two teeth of each pair. Each of the pairs of teeth in each row is longitudinally staggered relative to the pairs of teeth in adjacent rows a distance sufficient to position each tooth of each pair slightly longitudinally offset from a tooth of a pair of teeth in a laterally adjacent row. Each tooth of each pair of teeth includes an elongate shank section rising upwardly from the metal plate, an asymmetrically shaped tip section extending upwardly from the shank section, and a laterally offset point at the upper end of the tip section. The tip sections of each tooth are configured so that the teeth of adjacent rows which are slightly longitudinally offset relative to each other have their points alternating laterally offset toward and then away from each other along the length of the connector plate. Furthermore, the base or lower portion of the shank section of each tooth is slightly twisted about an axis extending longitudinally of the height of the tooth while the upper portion of the shank of each tooth remains generally transversely symmetrical about such longitudinal axis so that the side edges of the shank upper portion actually extends laterally outwardly of the corresponding edges of the shank base portion.

12 Claims, 8 Drawing Figures

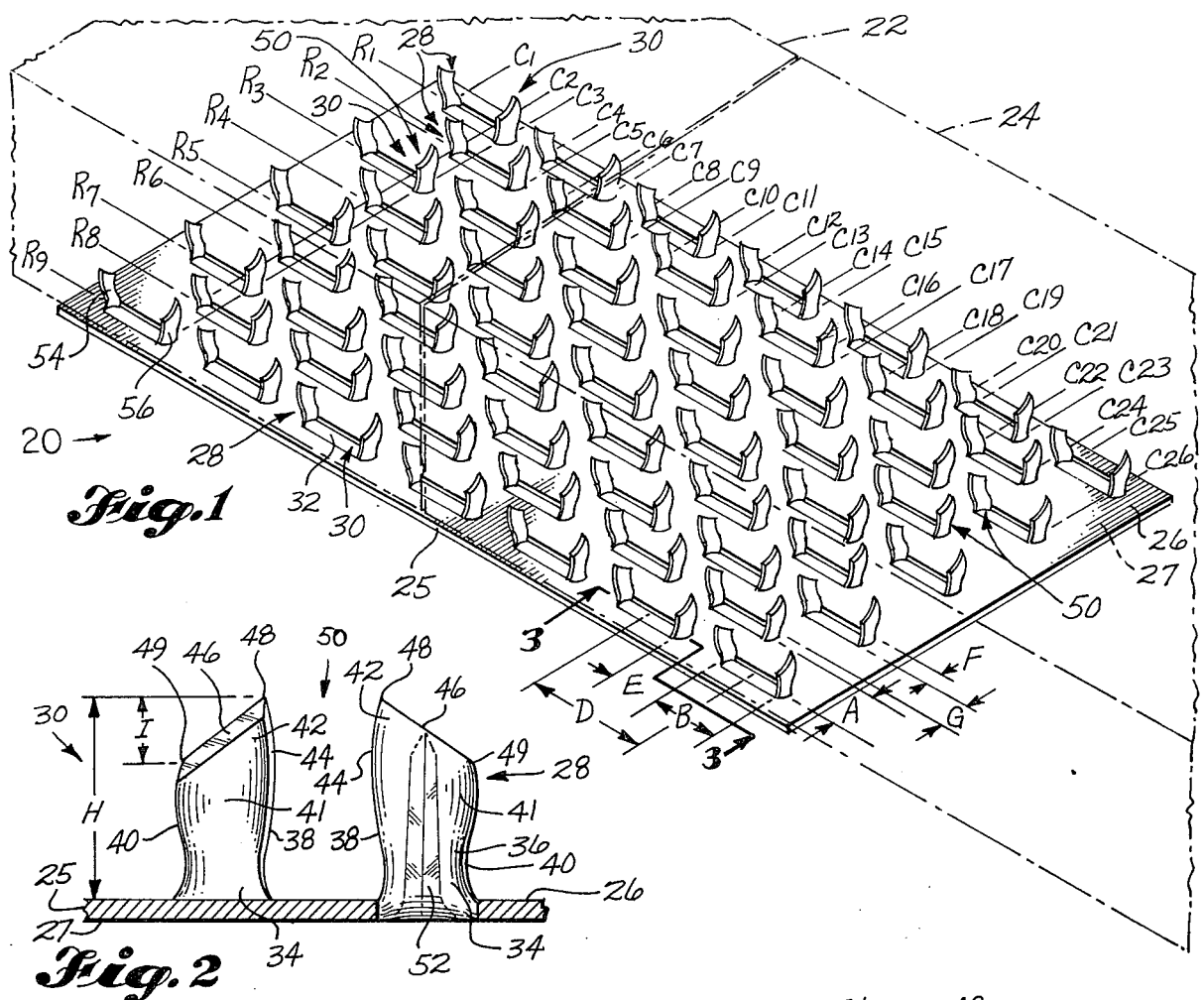
Fig. 1
Fig. 2
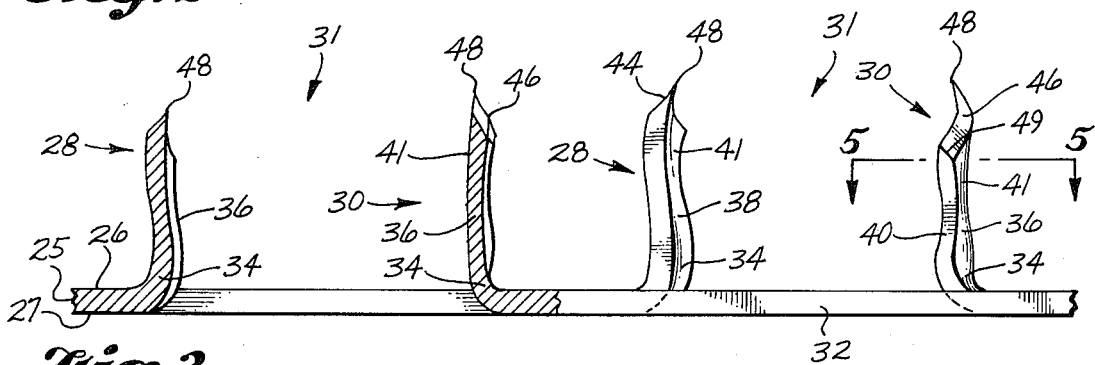
Fig. 3
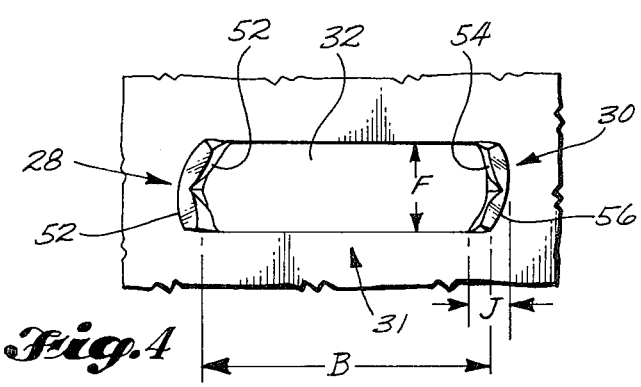
Fig. 4
Fig. 5

CONNECTOR PLATE

BACKGROUND OF THE INVENTION

1. Field of the Invention

This invention relates to connector plates, and more particularly to metal connector plates used in prefabricating wooden structural members such as roof trusses.

2. Description of the Prior Art

Metal connector plates in various configurations have been utilized to join together wooden components for forming structural members such as roof trusses, box beams and pallets. Generally the connector plates are formed from flat metal plates in which slender, nail-like teeth are punched or struck out to extend generally perpendicularly outwardly from one face of the plate. A void or slot is left in the plate at the locations in which the teeth have been punched out.

To prefabricate wooden structures, such as roof trusses or box beams, wooden members are first arranged in coplanar relationship to each other and then connector plates are placed over the various joints so that the side of the connector plate from which the teeth are struck out lies adjacent the wood members. Usually, a connector plate is positioned on each side of the wood members. Then the teeth of both connector plates are simultaneously driven into the wood members by well-known means such as through the use of either a C-shaped hydraulic ram press or by a gantry type roller press. Once embedded, the teeth securely fasten the connector plates to the wooden members to enable the plates to keep the wooden members joined together while transmitting loads between the members of the wooden structure.

Wooden roof trusses constructed with connector plates of the type described above have been found to be stronger than conventional nailed roof trusses of equal weight. Thus, for a given load and span, trusses incorporating connector plates can be made from smaller sized lumber thereby decreasing construction costs. Moreover, the use of metal connector plates enables roof trusses to be prefabricated at a central manufacturing location at a cost significantly less than that required to construct roof trusses at particular job sites in the traditional fashion wherein each member of the truss is individually cut and nailed together by workmen.

Nevertheless, connector plates and wooden roof trusses constructed with connector plates are not without deficiencies. When truss joints are highly stressed, connector plates often either pull out of the wood or alternatively the plate itself fails. To forestall failure of the truss joints under load, the teeth of the connector plate have been formed in various configurations and lengths. Furthermore, in an attempt to improve the load carrying capacity of truss joints, teeth have been struck out from the plate material in a wide variety of patterns.

When wooden truss members are heavily loaded during use, conventional connector plates have a tendency to pull out of the wood. In an effort to prevent the pulling out of the teeth, conventional connector plates have been constructed with a large number of teeth per unit area of connector plate thereby increasing the surface area and number of teeth against which the wood fibers bear when the truss is loaded. Reducing the load that each tooth is required to carry correspondingly decreases the likelihood that the teeth will pull back out of the wood.

One manner of increasing the number of teeth per unit area of connector plate is by striking the teeth out in pairs thereby leaving only one slot in the plate material for each two teeth. As illustrated by Jureit et al, U.S. Pat. No. 3,892,160, striking the teeth out in pairs permits twice as many teeth to be struck out per unit of connector plate while still leaving a maximum amount of plate material surrounding each tooth thereby minimizing the reduction in the strength of the plate itself. Other examples of connector plates having teeth struck out in pairs are disclosed by Templin et al, U.S. Pat. Nos. 3,277,768; Sanford 3,498,170; Wood, 3,603,197; and, Moehlenpah, 3,951,033.

However, increasing the number of per unit area of connector plate may have negative effects. As the number of teeth is increased, the tensile strength of the plate itself is lowered due to the reduced amount of metal left in the plate after the teeth have been struck out. If too many teeth are struck out, the plate is weakened to the point that it is incapable of carrying the tensile loads imparted by the wood members thereby resulting in failure in the plate itself. Furthermore, as the number of teeth per unit area of connector plate is increased, the tendency of the wood fibers to split when the plate is pressed into the wood members increases so that the structural strength of the wooden members themselves is diminished. Thus, there is a limit to which wooden joints can be strengthened by simply increasing the number of connector plate teeth.

Other attempts to prevent connector plate failure, include constructing the teeth with one or more laterally extending barbs to thereby theoretically lock wood fibers between the surface of the connector plate and the barb. Examples of connector plates utilizing this type of tooth construction are disclosed by Menge U.S. Pat. No. Re. 28,427; Menge U.S. Pat. Nos. 3,011,226; Foley et al 3,090,088; Carr 3,266,362; and, Wood 3,603,197. However, as indicated, the extent to which wooden joints can be strengthened by utilizing barbed teeth is limited. If the barbs extend very far laterally from the primary portion or shank of the tooth, the adjacent wood fibers will be cut or severed as the tooth is pressed into the wood member. As a result, the load carrying capacity of the joint is actually decreased.

In another type of known connector plate, the teeth are configured to deform or bend as they are driven into the wooden members to thereby lock wood fibers between the tooth and the surface of the connector plate. In some such connector plates, the teeth are formed with asymmetrically shaped tip portions. The reaction of the asymmetrical tip portions against the wood fibers creates a force component acting perpendicularly to the height of the teeth thereby causing the teeth to deflect as they are driven into the wooden members. Examples of connector plates having this type of tooth construction are disclosed by Black et al, U.S. Pat. Nos. 3,382,752; Moehlenpah 3,417,651; and, Jureit et al 3,892,160.

In yet another type of connector plate utilizing teeth that deflect as they are pressed into the wood, the tip portions are nominally bent or askewed relative to the remainder of the tooth. The bent tip portion of the tooth acts as a camming surface which produces a reaction force acting in a direction across the height of the tooth causing the teeth to deform laterally as they are driven into the wood. Examples of connector plates incorporating this type of tooth configuration are disclosed by Foley et al. U.S. Pat. Nos. 3,090,088; Moehlenpah et al 3,322,018; Koenigshof 3,343,439; and Black et al 3,382,752.

In a further attempt to prevent connector plates from withdrawing from wooden members, the teeth have been twisted in the manner resembling the configuration of a corkscrew. Examples of this type of connector plate is disclosed by Schmitt U.S. Pat. Nos. 3,633,454; Jureit et al 3,892,160 and 4,031,803, wherein the teeth are twisted along their height. A connector plate with this particular tooth configuration also has been manufactured by P. H. Bowman Company, Inc. of Seattle, Wash.

Another common manner of connector plate failure occurs when the plates are loaded in a direction transversely of the face of the struck out teeth. In this direction of loading there is considerably less tooth area for the wood fibers to bear against so the teeth can withstand a smaller load then if they are loaded in a direction normal to their face. In an attempt to overcome this shortcoming, connector plates, as exemplified by Foley et al U.S. Pat. Nos. 3,090,088 and Black et al 3,382,752, have been constructed with sets of teeth disposed both longitudinally and transversely to the length of the connector plate. Also, connector plates have been constructed with generally flat or planar teeth which are askewed or rotated relative to the longitudinal axis of the connector plate to thereby increase the surface area of the tooth in the direction transverse to the length of the connector plate. An example of this type of connector plate is disclosed by Moehlenpah U.S. Pat. No. 3,951,033.

In spite of the various types of connector plate construction thusly described, applicant is not aware of any connector plate which optimumly incorporates all of the desirable characteristics of connector plates. Some of the known connector plates provide a large number of teeth in an attempt to prevent withdrawal of the connector plate from the wooden members but as a result compromise the strength of the connector plate itself causing it to fail when loaded. Other connector plates provide a sufficient capacity to carry loads which act longitudinally of the connector plate but are unable to withstand any substantial load in the direction transverse to the length of the connector plate. Furthermore, although some connector plates are designed to lock wood fibers between the teeth and the connector plates, they also gouge or tear the wood fibers thereby substantially decreasing the load carrying capacity of the wood members themselves.

SUMMARY OF THE INVENTION

The present invention relates to a novel metal connector plate for joining together wooden components to form various structural members, such as roof trusses or box beams. In basic form the connector plate is comprised of a thin metal plate from which a plurality of longitudinally extending rows of teeth have been struck out to extend outwardly from one face of the plate. The teeth are struck out in longitudinally aligned, spaced pairs with each pair leaving a single elongate slot in the plate between the two teeth of the pair. The pairs of teeth in each row are longitudinally staggered relative to the pairs of teeth in the immediately adjacent rows so that one tooth of each pair is slightly longitudinally offset from a tooth of a pair of teeth in any adjacent row. Preferably the pairs of teeth in adjacent rows are also longitudinally staggered so that each pair of teeth is spaced medially with respect to the two longitudinally adjacent pairs of teeth in any immediately adjacent row of teeth.

Each tooth is formed with a shank section extending upwardly from the plate and an asymmetrically shaped tip section at the upper end of the shank section. The tip section converges to a laterally offset point at the upper end of the tip section. The teeth are arranged so that the two teeth in adjacent rows which are slightly longitudinally staggered with respect to each other have their teeth points alternatingly laterally offset towards and then away from each other along the length of the connector plate. Furthermore, the base or lower portion of each shank section of each tooth is slightly twisted about an axis extending along the height of the tooth. As a result, the side edges of the upper untwisted portion of each shank section extends laterally outwardly of the corresponding side edges of the lower twisted shank portion.

It is a principal object of the present invention to provide a new and improved connector plate for securely fastening together wooden components to form structural members with enhanced load carrying characteristics.

Another object of the present invention is to provide a connector plate capable of withstanding forces in directions parallel and perpendicular to the length of the plate without withdrawing from the wood members when the teeth are embedded in the wood members.

A further object of the present invention is to provide a connector plate with teeth cooperating together to tightly clinch wood fibers without materially reducing the strength of the wooden members themselves.

An additional object of the present invention is to provide a connector plate with a large number of teeth per unit of connector plate area; however, without materially compromising the strength of the plate itself.

Still another object of the present invention is to provide a connector plate having teeth which are easily and inexpensively formed and also which are conveniently arranged relative to each other to permit connector plates to be formed in selective sizes.

One more object of the present invention is to provide a connector plate with an optimum number of teeth, spacing between teeth, length of tooth, and tooth configuration to thereby enable the joints formed with such connector plates to carry a maximum load for a given minimum size of connector plate.

BRIEF DESCRIPTION OF THE DRAWINGS

FIG. 1 is an isometric view of one typical embodiment of the present invention showing a connector plate interconnecting abutting wooden members illustrated in broken line;

FIG. 2 is an enlarged front elevational view of a set of connector plate teeth illustrated in FIG. 1 and taken substantially along lines 2—2 thereof;

FIG. 3 is a fragmentary, enlarged, side elevational view of the connector plate illustrated in FIG. 1, taken substantially along lines 3—3 thereof and illustrating a pair of teeth in cross section;

FIG. 4 is an enlarged plan view of a typical pair of teeth shown in FIG. 1;

FIG. 5 is a greatly enlarged cross-sectional view of one of the teeth shown in FIG. 3, taken substantially along lines 5—5 thereof;

DETAILED DESCRIPTION

Figure 6:
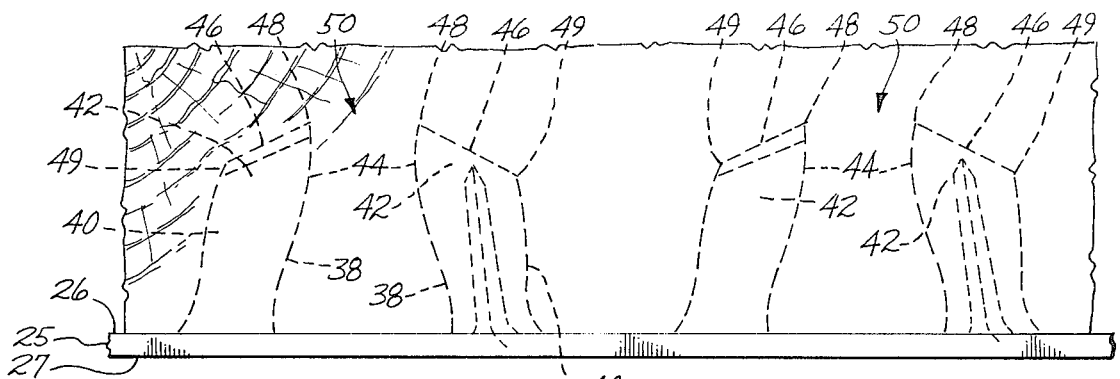
FIG. 6 is an enlarged, fragmentary front elevational view of teeth shown in FIG. 1, specifically illustrating the lateral deformation of the teeth which occurs when said teeth are embedded into a wooden member.

Referring initially to FIG. 1, a connector plate 20 constructed according to the present invention is shown joining together two wooden members 22 and 24, shown in phantom lines. In the preferred form illustrated, connector plate 20 is comprised of a thin sheet metal plate 25 having an inner face 26 and an outer face 27. Rows of elongate, nail-like teeth 28 and 30 are struck out from plate 25 in pairs 31 thereby leaving a single, rectangularly shaped slot 32 between said two teeth 28 and 30. The width of each tooth 28 and 30 is disposed generally transversely to the length of plate 25. All of the teeth 28 face in the same direction towards a corresponding tooth 30. Accordingly, all of the teeth 30 face in the same direction towards a corresponding tooth 28. The teeth 28 and 30 are all struck out from the same side of plate 25 to extend perpendicularly outwardly from inner face 26.

Again referring to FIG. 1, pairs of teeth 28 and 30 are illustrated as struck out in longitudinally aligned rows R1 through R9, which rows are transversely spaced apart from each other a uniform distance A. The teeth 28 and 30 are also themselves longitudinally aligned along their corresponding rows R1 through R9 so that slots 32, formed by teeth pairs 31 are aligned with rows R1-R9. Furthermore, the two teeth 28 and 30 of each pair 31 are spaced a uniform longitudinal distance B apart from each other while each pair 31 is also spaced a longitudinal interval distance D from the adjacent pair 31 of teeth 28 and 30 along the same row. However, the pairs 31 in each row are relatively staggered in the direction of the length of rows R1-R9 with respect to the pairs 31 of teeth 28 and 30 in any of the immediately adjacent rows so that the teeth 28 and 30 of each pair 31 in every other row are transversely aligned relative to each other in columns. Thus, teeth 28 and 30 in each odd numbered row R1, R3, R5, R7 and R9 are transversely aligned relative to each other to form columns C1, C3, C4, C7, C8, C11, C12, C15, C16, C19, C20, C23, C24 and C26. Likewise, the teeth 28 and 30 in each of the even numbered rows R2, R4, R6, and R8 are longitudinally offset with respect to the teeth 28 and 30 in each odd numbered row and are transversely aligned relative to each other to form columns C2, C5, C6, C9, C10, C13, C14, C17, C18, C21, C22, and C25. Preferably each pair of teeth 31 in each even numbered row is longitudinally medially offset with respect to the pairs of teeth 31 in each odd numbered row so that each pair of teeth 31 in each even numbered row lies halfway between two longitudinally adjacent pairs of teeth 31 in each odd numbered row.

As illustrated in FIG. 1, the length B of each slot 32, which is also the nominal distance separating the teeth 28 and 30 of each pair 31, is longer than the longitudinal distance E separating the longitudinally spaced teeth pairs 31 in each row R1-R9. As a combined result of the particular longitudinal spacing B between the teeth 20 and 28 of each pair 31, the particular longitudinal distance Y between adjacent pairs of teeth 31 in each row, and the longitudinally medially staggered spacing between the pairs of teeth 31 in adjacent rows, each tooth 28 in each row is slightly longitudinally staggered with respect to a tooth 30 in the adjacent two rows. Likewise, as shown in FIGS. 1 and 3, each tooth 30 in each row is slightly longitudinally staggered with respect to a tooth 28 lying in the adjacent two rows. For example, tooth 28 located at row R2, column C2, is slightly longitudinally staggered with respect to tooth 30 located at row R1, column C3, and with respect to tooth 30 and row R3, column C3. As a result, each column of teeth 28, for instance column 2, closely neighbors a column of teeth 30, for instance, column 3. It can be appreciated that spacing pairs of teeth so that the distance E separating adjacent pairs of teeth is less than the spacing B between teeth 28 and 30 of each pair of teeth 31 and medially staggering pairs of teeth 31 of adjacent rows R1-R9, as illustrated in FIG. 1, permits a large number of teeth 28, 30 to be struck out from each unit area of plate 25 without unduly compromising the strength of said plate 25 itself.

Turning now to FIGS. 2-4, each tooth 28 is formed essentially identically and each tooth 30 is also formed essentially identically. Moreover, as discussed infra, teeth 28 and 30 are substantially identical to each other except that they are formed in a mirror image of each other. Each tooth 28 and 30 includes an elongate shank section 36 extending upwardly from plate inner face 26. Shank 36 includes a lower or base portion 34 at its intersection with plate 25 and generally vertically extending side edges 38 and 40. Extending upwardly or outwardly from the upper portion 41 of shank section 36 is an asymmetrically shaped tip section 42 which has a generally vertically disposed side edge 44 which continues vertically upwardly from edge 38 of shank section 36, and a second side or camming edge 46 which extends diagonally upwardly from the upper end of edge 40 of shank section 36 to converge with side edge 44 at a sharp point 48. The intersection of shank side edge 40 and tip portion camming edge 46 defines a shoulder 49. Preferably, the vertical height I of each tip 42 is approximately one-third the total height H of each tooth 28 and 30. It can be appreciated that forming each tip section 42 with a sharp point 48 permits teeth 28 and 30 to be pressed into wooden components 22 and 24 with a minimum of force and also without unduly tearing or splintering or otherwise damaging the adjacent wood fibers.

As illustrated in FIGS. 1 and 2, the tip section 42 of each tooth 28 is formed asymmetrically oppositely to the tip section 42 of each tooth 30. Thus, the tip section 42 of each tooth 28 is formed asymmetrically oppositely to tip section 42 of the longitudinal adjacent teeth 30 lying in the two rows adjacent to the particular row in which tooth 28 lies. For example, the tip section 42 of teeth 28 located at row R2, column C2, is formed asymmetrically oppositely to tip section 42 of the teeth 30 located at row R1, column C3, and at row R3, column C3. Moreover, the point 48 of each tooth 28 is transversely offset toward one of the two longitudinally adjacent teeth 30 located in the two next adjacent rows while offset away from the other of the two longitudinally adjacent teeth 30 in the two next adjacent rows. Correspondingly, the point 48 of each tooth 30 is transversely offset toward a longitudinally adjacent tooth 28 in one of the two next adjacent rows while transversely offset away from a longitudinally adjacent tooth 28 of the other of the two adjacent rows. For example, the point 48 of tooth 28 located at row R2, column C2, is laterally offset towards tooth 30 located at row R3, column C3, and laterally offset away from tooth 30 located at row R1, column C3. Moreover, the point 48 of the next tooth along row R2 at column C5, is laterally offset away from the tooth 28 at row R3, column C4, but is laterally offset towards the tooth 28 at row R1, column C4. Thus, it will be appreciated that each of teeth 28 and 30 is located closely longitudinally adjacent a tooth 30 and 28, respectively, lying in a next adjacent row to form a staggered set of teeth 50 having their points 48 laterally offset towards each other. Examples of such sets 50 are represented by tooth 28 in row R2, column C2, and tooth 30 of row R3, column C3, and by tooth 30 in row R2, column C5, and tooth 28 in row R1, column C4.

As a result of forming teeth 28 and 30 in transverse sets 50 with the points 48 of the asymmetrically shaped tip sections 42 offset towards each other, when teeth 28 and 30 of each set 49 are pressed into wooden members 22 and 24, they deflect or bend laterally towards each other to thereby cooperate together to rightly clinch wood fibers between them, FIG. 6. As teeth 28 and 30 enter wooden members 22 and 24, the reaction between camming edge 46 and the wood fibers creates a horizontal directed force component which acts transversely across the width of teeth 28 and 30 in the direction toward tip vertical side edge 44 thereby causing teeth 28 and 30 of each set 50 to bend laterally towards each other. The clinching action of teeth 28 and 30 is perhaps enhanced by the fact that the teeth 28 and 30 of each transverse set 50 are only slightly longitudinally offset from each other thereby preventing the clinched wooden fibers from becoming loosened by transversely twisting with respect to teeth 28 and 30 when connector plate 20 is loaded which could occur if said two teeth were longitudinally spaced apart any substantial distance. Furthermore, it can be appreciated that constructing connector plate 20 so that the teeth 28 and 30 of each set 50 are located in adjacent rows, ensures that the portions of plate 25 which transversely separates the two teeth 28 and 30 of each set 50 contains sufficient structural strength to permit teeth 28 and 30 to tightly clinch wood fibers without loosening even when connector plate 20 is heavily loaded.

Now referring specifically to FIGS. 4 and 5, it can be seen that each tooth 28 and 30 is arcuate or V-shaped in cross section having a laterally medially located groove 52 extending upwardly along the height of said teeth 28 and 30. Groove 52 is formed in each tooth 28 and 30 as they are struck out from plate 25. Accordingly, each tooth 28 and 30 of each pair 31 has a concave surface 54 facing each other and a convex surface 56 facing away from each other. Constructing teeth 28 and 30 with a V-shaped cross section enhances the column strength of said teeth to prevent them from buckling as they are pressed into wooden components 22 and 24.

Again referring to FIGS. 4 and 5, the lower or base portion 34 of the shank section 36 of each tooth 28 and 30 is slightly twisted about an axis coincident with the length of each tooth 28 and 30. As viewed in FIG. 4, base portion 34 of each tooth 28 and 30 is twisted in the clockwise direction so that shank side edge 40 constitutes the leading edge of the twist while shank side edge 38 constitutes the trailing edge of the twist. The upper section 41 of each shank section 36 is not twisted but rather remains substantially transversely symmetrical about the length of its corresponding row R1–R9. As a result of the twist in the base portion 34 of each shank section 36, shank side edges 38 and 40 extend progressively laterally outwardly along the height of shank 36 so that at the elevation of shoulder 49 shank side edges 38 and 40 actually extend laterally outwardly beyond the lateral location of shank side edges 38 and 40 at the elevation of base portion 34.

Since teeth 28 and 30 are actually slightly wider at the elevation of shoulder 49 than at base portion 34, as teeth 28 and 30 are pressed into wood members 22 and 24, their widely spaced side edges 38 and 40 at shank upper portion 41 initially push adjacent wood fibers laterally outwardly; however, as teeth 28 and 30 imbed deeper into wooden components 22 and 24, the wood fibers are permitted to return toward their natural undeflected location to press against the narrower shank base portion 34. Thus, once teeth 28 and 30 are pressed into wooden components 22 and 24, wood fibers are effectively locked between plate inner face 26 and shank side edges 38 and 40 thereby increasing the resistance of teeth 28 and 30 against withdrawal from wood components 22 and 24 when connector plate 20 is loaded.

Applicant has found that forming teeth 28 and 30 with a slight twist in shank base portion 34 also results in the advantage that connector plate 20 is capable of carrying substantially larger loads in directions askewed relative to the length of rows R1–R9. This is important since in actual use connector plate 20 must often carry loads in directions other than along the length of rows R1–R9. Applicant also has discovered that twisting teeth 28 and 30 along their entire heights, does not significantly increase the capability of connector plate 20 to carry loads in directions askewed to the length of rows R1–R9 over the increased load carrying capability achieved by only twisting the base portion 34 of each tooth 28 and 30 in the manner described above. Moreover, if teeth 28 and 30 were twisted along their entire length in a corkscrew-like fashion, said teeth would not be wider at the elevation of shoulder 49 than at base portion 34, and thus wood fibers would not be clinched between shank side edges 38 and 40 and plate inner face 26 in the manner described above.

In the preferred form of the typical connector plate 20, shown in FIGS. 1–6, plate 25 is composed of twenty gage galvanized sheet steel material having a thickness of approximately 0.0375 inch and meeting ASTM-A-446, grade A, or better. Furthermore rows R1–R9 are spaced transversely a distance A of 0.33 inches apart to thereby permit connector plate 20 to be conveniently produced in difference widths of one inch increments with each one inch additional or reduced width, three rows of teeth 28 and 30 would be added to or removed from connector plate 20, respectively. The teeth 28 and 30 of each pair 31 are spaced apart a longitudinal distance B of 0.45 inch. Adjacent pairs of teeth 31 are preferably spaced apart on incremental centers D of 0.75 inch thereby resulting in a distance E of 0.225 inch longitudinally separating said adjacent pairs of teeth 31. This incremental spacing between adjacent pairs of teeth 28 and 30 enable connector plate 20 to be conveniently formed in lengths of 0.75 inch increments.

Furthermore, each slot, and thus the maximum width of each tooth 28 and 30, is preferably of a width F of 0.125 inch thereby resulting in the transverse distance or width G between slots 32, as measured along the columns C1–C26, of 0.22 inch. This particular width G of material separating teeth 28 and 30 along columns C1–C26 ensures that plate 25 has adequate structural integrity surrounding each tooth 28 and 30 to permit each set of teeth 50 to tightly clinch wood fibers between them as teeth 28 and 30 are deformed toward each other.

As illustrated in FIG. 2, preferably each tooth 28 and 30 is of a height H equal to 0.35 inch with the height I of tip 42 equal to approximately one-third the total height of each tooth or 0.12 inch. Also, the total profile thickness J of each tooth 28 and 30 is 0.178 inch. The size of each tooth 28 and 30 and their relative spacing about the area of plate 25 results in approximately eight teeth per square inch of plate 25.

It is to be appreciated that the particular size of teeth 28 and 30 and their relative spacing about plate 20 can be altered to accommodate different applications for connector plate 20 and also to accommodate different types, designs and sizes of wood components 22 and 24. Furthermore, teeth 28 and 30 can be of different heights to, for instance, decrease the force needed to initially press teeth 28 and 30 into wooden components 22 and 24.

The foregoing described connector plate 20, characterized by teeth 28 and 30 which each deform laterally toward a corresponding tooth in an adjacent row to form a set of teeth 50 which tightly clinch wood fibers; by slightly twisting shank base portion 34 which increases the capability of plate 20 to carry loads in directions askewed with the length of rows R1–R9; by shank edges 38 and 40 extending laterally outwardly along the height of each tooth 28 and 30 to clinch wood fibers between said edges and plate 26; and, by the relatively close spacing of teeth 28 and 30 on plate 25 to provide an average of eight teeth per square inch of plate 25, results in an optimum design for the connector plate 20 which maximizes its load carrying capability when joining grained wooden members such as members 22 and 24.

Figure 7:
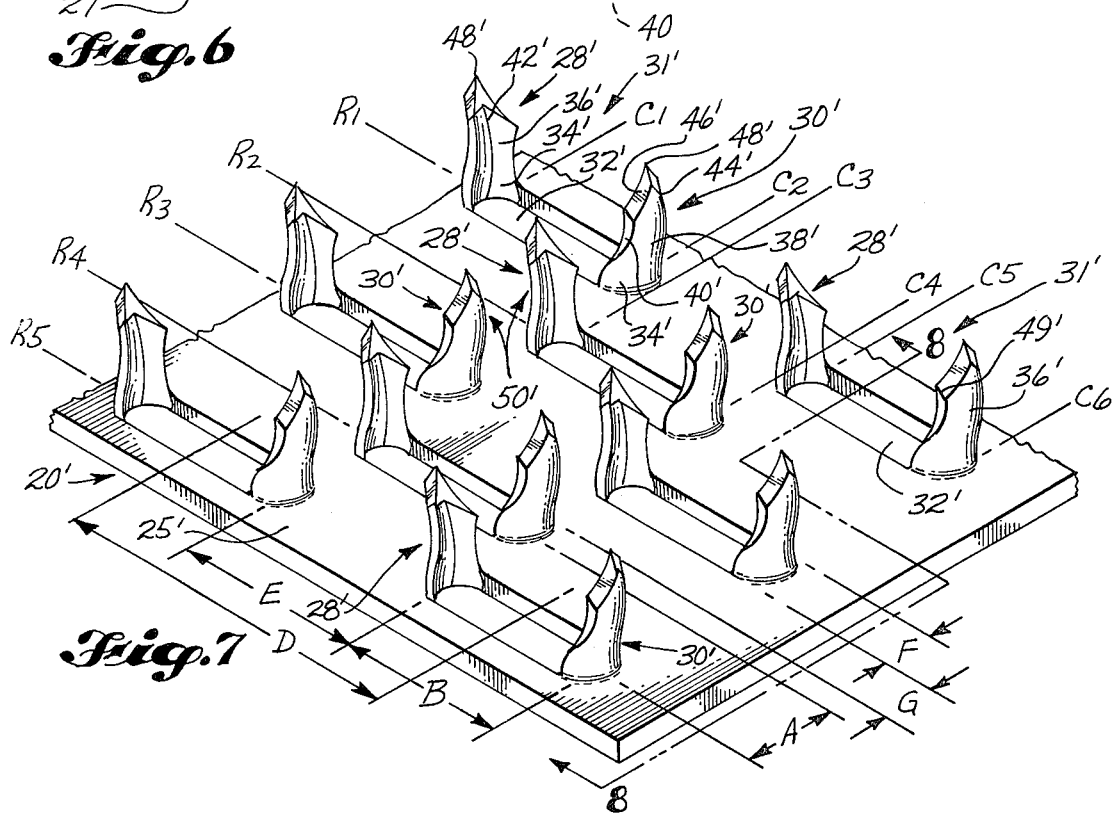
FIG. 7 is an enlarged, fragmentary isometric view of another typical embodiment of the present invention; and, FIG. 8 is an enlarged, side elevational view of the connector plate shown in FIG. 7, taken substantially along lines 8—8 thereof with portions of the connector plate shown in cross section.
Figure 8:
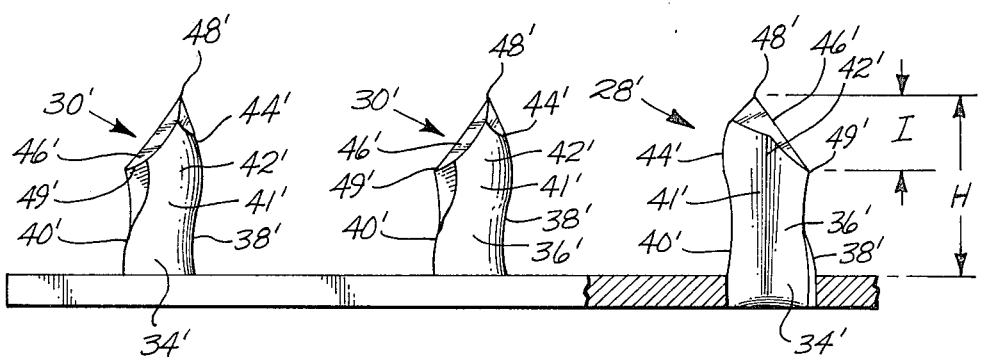

FIGS. 7 and 8 illustrate another typical embodiment of the present invention wherein connector plate 20' includes a plate 25' constructed from 16 gage galvanized steel material 0.062 inch thick and meeting ASTM-A-446 Grade, or better. Pairs 31' of teeth 28' and 30' have been struck out from plate 25' forming a slot 32' between them. The teeth 28' and 30' are arranged in longitudinal rows and in transverse columns in a manner similar to that shown in FIGS. 1–8. For economy of space only a portion of connector plate 20' is illustrated in FIG. 7.

The construction of teeth 28' and 30' is similar to the construction of teeth 28 and 30 shown in FIGS. 1–8. Specifically, teeth 28' and 30' each includes a shank section 36', shank side edges 38' and 40', and an asymmetrically shaped tip section 42' at the upper end of shank 36'. Tip section 42' includes a vertical side edge 44' extending upwardly from shank side edge 38' and a diagonally disposed or camming edge 46' which converges with side edge 44' at an offset point 48'. Each shank section 36' also includes a base portion 34' at the innersection of the shank 36' with plate 25'. Furthermore, the lower or base section 34' of each shank 36' is slightly twisted about an axis extending along the height of each tooth 28' and 30'. The tip sections 42' of teeth 28' and 30' are also offset laterally oppositely to each other.

The distance A between adjacent rows R1–R5 is 0.33 inch, thereby permitting connector plate 20' to be conveniently formed in widths of one inch increments. Each tooth 28' and 30' has a width F of 0.16 inch while the transverse spacing G between teeth of adjacent rows is 0.17 inch. The spacing B between teeth 28' and 30' of each pair 31' is approximately 0.54 inch while the longitudinal incremental spacing D between each of teeth pair 31' in each row is 1.25 inches, thus leaving a longitudinal distance E of approximately 0.71 inch between adjacent pairs of teeth 31'. The incremental spacing between longitudinally adjacent pairs of teeth 31' permits connector plate 20' to be conveniently formed in 1.25 inch increments.

As in the typical embodiment shown in FIGS. 1–6, pairs of teeth 31' in each row R1–R5 are positioned substantially medially between longitudinally adjacent pairs of teeth 31' of the adjacent rows to thereby form columns of teeth C1 and C6. Since the spacing B between the two teeth 28' and 30' of each pair 31' is slightly less than the distance E separating longitudinally adjacent pairs of teeth 31 in each row R1–R5, each tooth 28' lies slightly longitudinally offset from an oppositely shaped tooth 30' of an adjacent row. Likewise each tooth 30' lies slightly longitudinally offset from an oppositely shaped tooth 28' lying in the adjacent rows. For instance, tooth 28' at row R2, column C3, is slightly longitudinally offset from tooth 30 of row R3, column C2. The points 48' of these two particular teeth are furthermore laterally offset towards each other to form a set of teeth 50'. Thus, as in the embodiment illustrated in FIGS. 1–6, teeth 28' and 30' are arranged in transverse sets 50' with the teeth in each such set 50' deforming laterally towards each other as they are pressed into wooden components 22' and 24' to thereby cooperate together to tightly clinch wood fibers between them.

Each tooth 28' and 30' is preferably of a height H of 0.41 inch with the height I of the tip section 42' being approximately 0.14 or one-third the total height of each tooth 28' and 30'. Each tooth 28' and 30' is also formed in an arcuate V-shaped cross section along its total height, thereby resulting in a tooth having a profile or formed thickness J of 0.178 inch. The size of each tooth 28' and 30' and their relative spacing results in connector plate 20' having an average of 4.8 teeth per square inch of plate 25'.

It can be appreciated that the typical connector plate 20' shown in FIGS. 7 and 8 also provides the same advantages in the art as provided by the connector plate shown in FIGS. 1–6. Specifically teeth 28' and 30' are arranged in transverse sets 50' with the teeth of each set 50' deforming towards each other upon penetration into wooden components 22' and 24' to tightly clinch wood fibers between them. Additionally, the slight twist in the shank base portion 34' of each tooth 28' and 30' enhances the ability of connector plate 20' to carry loads in directions askewed from the length of rows R1–R9. Moreover, because only the shank base portion 34' of each tooth 28' and 30' is twisted, the shank edges 38' and 40' progressively spread apart along the height of each of said tooth, resulting in each shank section 36' being wider at the elevation of shoulder 49' than at the lower elevation of shank base portion 34'. Thus, when teeth 28' and 30' are embedded into wooden components 22 and 24, the wood fibers lying adjacent to edges 38' and 40' are tightly clinched between plate 26' and said edges 38' and 40'.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A connector plate for joining together wooden members comprising:
  (a) a thin metal plate;
  (b) a plurality of longitudinally extending rows of elongate teeth struck out from said plate to extend outwardly from one face of said plate, said teeth being struck out and longitudinally aligned, spaced pairs with each of said pairs of teeth leaving a single, elongate slot in said plate between the two teeth of each pair of said teeth; and
  (c) each tooth of each of said pair of teeth comprising: an elongate shank section having a base portion at the intersection of said shank section and said plate, and an upper portion extending upwardly from said base portion,
  a tip section extending upwardly from said shank section, and
  the shank base portion of each tooth of each of said pair of teeth being slightly twisted about an axis extending longitudinally of the height of said tooth with the shank upper portion of said tooth being rotated with the base portion but remaining generally untwisted throughout the length of the shank upper portion so that the shank upper portion extends laterally outwardly of the corresponding twisted shank base portion.

2. The connector plate according to claim 1, wherein: each of said pairs of teeth in each row being longitudinally staggered relative to the pairs of teeth in adjacent rows a distance sufficient to position each tooth of each pair of teeth slightly longitudinally offset from a tooth of a pair of teeth in a laterally adjacent row; and
  each of said teeth having a laterally offset point at the upper end of said tip section, with said tip section of each said tooth being configured so that the slightly longitudinal offset teeth of any adjacent row of said teeth have their points alternatingly laterally offset toward and away from each other along the length of the connector plate.

3. The connector plate according to claim 2, wherein the teeth of each of said pair of teeth have their points laterally offset oppositely of each other.

4. The connector plate according to claims 2 or 3, wherein each tip section of each of said tooth includes a generally vertically extending side edge terminating at said point and a camming side edge extending diagonally upwardly from the intersection of said shank section and said tip section to said point so that, as each of said teeth is pressed into a wooden member, the longitudinally adjacent teeth of adjacent rows which have their respective points offset laterally toward each other are deformed laterally toward each other to cooperate together to tightly clinch the fibers of the wooden members.

5. The connector plate according to claim 4, wherein said tip section of each of said teeth is approximately one-third the overall tooth height.

6. The connector plate according to claim 2, wherein the two teeth of each of said pair of teeth is separated by a distance greater than the distance separating each of said longitudinally adjacent pairs of teeth; and said pairs of teeth in adjacent rows are longitudinally staggered relative to each other so that each pair of teeth in each row is spaced medially between two longitudinally adjacent pairs of teeth in each adjacent row of said teeth.

7. The connector plate according to claims 2 or 6, wherein said plate is 20 gage steel sheet material having an average of about seven teeth being struck out from each square inch of said sheet material with each of said teeth being about 0.25 to about 0.45 inch in height.

8. The connector plate according to claim 2, wherein said plate is 16 gage steel sheet material having an average of about 4.8 teeth struck out from each square inch of said sheet material with each of said teeth being from about 0.31 to about 0.51 inch in height.

9. The connector plate according to claim 2, wherein at least said base portion of each of said teeth has an arcuate, transverse cross-section with the two teeth of each pair of said teeth each having a generally concave surface facing towards each other and a convex surface facing oppositely away from each other.

10. The connector plate according to claim 1, wherein the teeth of each said pair of teeth located in alternating rows are transversely aligned in columns extending perpendicularly to said rows of teeth.

11. The connector plate according to claim 1, wherein one tooth of each of said pair of teeth extends outwardly from said plate a distance further from the other tooth of each of said pair of teeth.

12. A connector plate for joining together wooden members, comprising:
  (a) a thin metal plate;
  (b) a plurality of longitudinally extending rows of elongate teeth struck out from said plate to extend outwardly from one face of said plate, said teeth being struck out in longitudinally aligned, spaced pairs with each of said pairs of teeth leaving a single elongate slot in said plate between the two teeth of each pair of said teeth;
  (c) each of said pairs of teeth in each row being longitudinally staggered relative to the pairs of teeth in adjacent rows a distance sufficient to position each tooth of each pair of teeth slightly longitudinally offset from an associated tooth of a pair of teeth in a laterally adjacent row;
  (d) each tooth of each of said pair of teeth comprising: an elongate shank section having a base portion at the intersection of said shank section and said plate and an upper portion extending upwardly from said base portion,
  an asymmetrical tip section extending upwardly from said shank section, and
  a laterally offset point at the upper end of said tip section, with the tip section of each said tooth being configured so that one tooth of each pair in one row and its associated slightly longitudinally offset tooth in the next adjacent row have their points laterally offset toward each other and the other tooth of each pair in one row and its associated slightly longitudinally offset tooth in the next adjacent row have their points laterally offset away from each other; and
  (e) the shank base portion of each tooth of each of said pair of teeth being slightly twisted about an axis extending longitudinally of the height of said tooth with the shank upper portion of said tooth remaining generally untwisted throughout the length of the shank upper portion so that the shank upper portion extends laterally outwardly of the corresponding shank base portion.

* * * * *